(12) United States Patent
Abu-Sharkh

(10) Patent No.: US 8,591,852 B2
(45) Date of Patent: Nov. 26, 2013

(54) METHOD OF PRODUCING SODA ASH AND CALCIUM CHLORIDE

(71) Applicant: Basel Fathi Abu-Sharkh, Al-Khobar (SA)

(72) Inventor: Basel Fathi Abu-Sharkh, Al-Khobar (SA)

( * ) Notice: Subject to any disclaimer, the term of this patent is extended or adjusted under 35 U.S.C. 154(b) by 0 days.

(21) Appl. No.: 13/651,534

(22) Filed: Oct. 15, 2012

(65) Prior Publication Data

US 2013/0039824 A1 Feb. 14, 2013

Related U.S. Application Data

(63) Continuation of application No. 13/402,783, filed on Feb. 22, 2012.

(51) Int. Cl.
*C01D 7/12* (2006.01)

(52) U.S. Cl.
USPC .......................................... 423/427; 423/423

(58) Field of Classification Search
USPC ................................................. 423/423, 427
See application file for complete search history.

(56) References Cited

U.S. PATENT DOCUMENTS

| | | | |
|---|---|---|---|
| 363,952 A * | 5/1887 | Frasch | 423/188 |
| 3,314,748 A | 4/1967 | Howard et al. | |
| 3,682,602 A * | 8/1972 | Mitkevich et al. | 23/303 |
| 4,172,017 A * | 10/1979 | Abraham | 205/367 |
| 4,406,869 A | 9/1983 | Nakaya et al. | |
| 6,284,005 B1 | 9/2001 | Hazen et al. | |
| 6,464,736 B1 | 10/2002 | Hazen et al. | |

FOREIGN PATENT DOCUMENTS

| | | |
|---|---|---|
| CN | 101717100 A | 6/2010 |
| CN | 101708858 B | 6/2011 |
| WO | WO 2011/138005 A1 | 11/2011 |

OTHER PUBLICATIONS

Olsen, 'Unit Processes and Principles of Chemical Engineering' Van Nostrand Inc. Jul. 5, 1932 pp. 1-3.*
"Green River Basin Water Plan Technical Memoranda", Wyoming State Water Plan website; 11 pages; printed on Dec. 18, 2011; http://waterplan.state.wy.us/plan/green/techmemos/induse.html.

* cited by examiner

*Primary Examiner* — Stuart Hendrickson
(74) *Attorney, Agent, or Firm* — Richard C Litman

(57) ABSTRACT

The method of producing soda ash and calcium chloride provides an environmentally friendly method of producing soda ash and calcium chloride without the production of waste and hazardous byproducts. The method of producing soda ash and calcium chloride is initiated with a volume of brine, which is ammoniated with gaseous ammonia to form ammoniated brine. Limestone is heated to produce calcium oxide and carbon dioxide. The ammoniated brine is reacted with the carbon dioxide to produce sodium bicarbonate, ammonium chloride and a brine effluent. The sodium bicarbonate is then calcined and decomposed to produce soda ash and gaseous carbon dioxide. The calcium oxide is reacted with the ammonium chloride to produce calcium chloride, water and ammonia. The ammonia is recycled to be used in the initial step of ammoniating the brine. The water and the brine effluent are also recycled and used to provide the brine in the initial step.

10 Claims, 1 Drawing Sheet

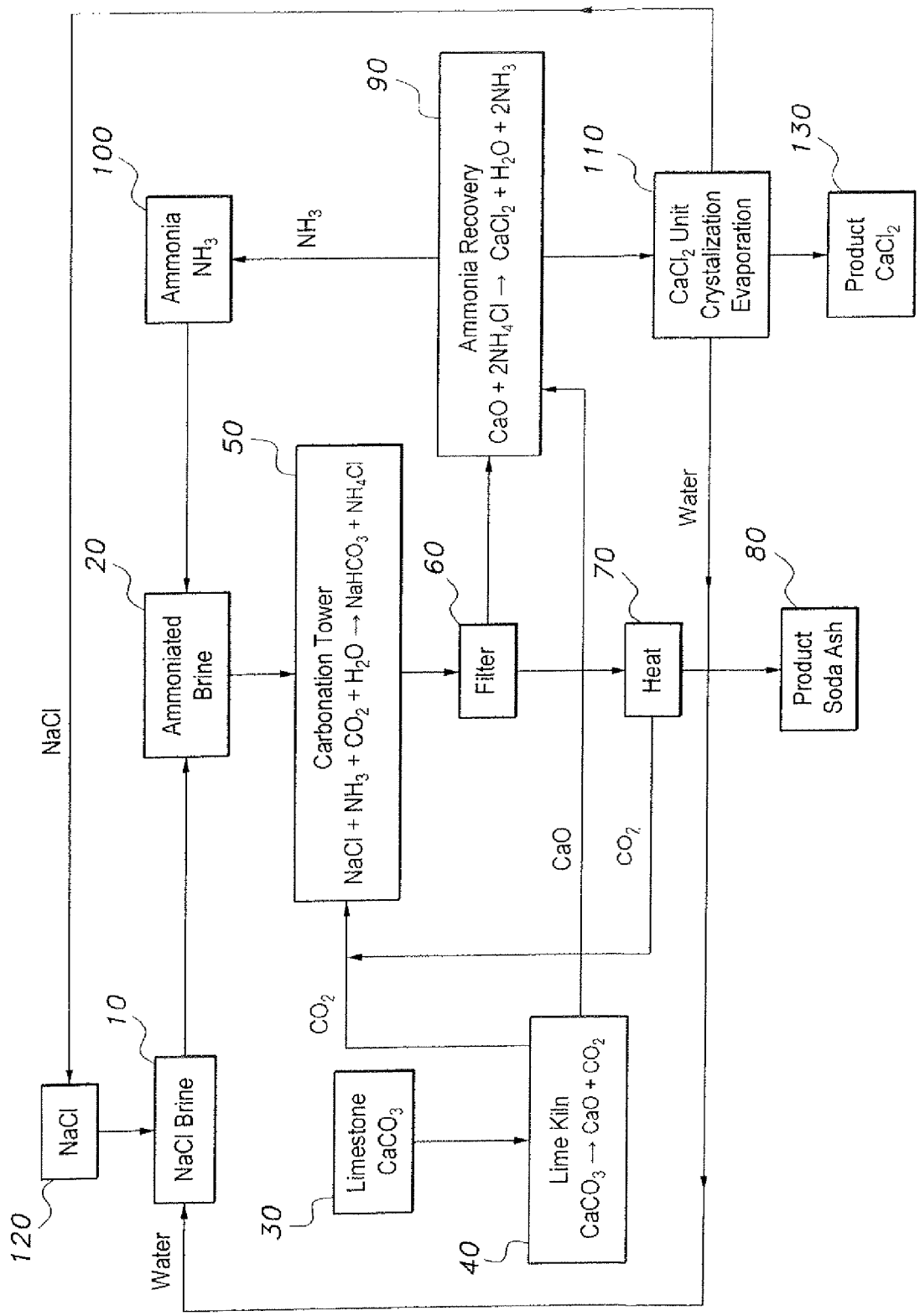

METHOD OF PRODUCING SODA ASH AND CALCIUM CHLORIDE

CROSS-REFERENCE TO RELATED APPLICATIONS

This is a continuation of my prior application Ser. No. 13/402,783, filed Feb. 22, 2012 now pending.

BACKGROUND OF THE INVENTION

1. Field of the Invention

The present invention relates to the production of soda ash and calcium chloride, and particularly to a modified version of the Solvay process that recycles ammonia, sodium chloride and water to eliminate harmful waste byproducts.

2. Description of the Related Art

The most common method of producing soda ash (sodium carbonate) is the Solvay process. The Solvay process was developed into its modern form by Ernest Solvay during the 1860s. The ingredients for this process are readily available and relatively inexpensive: salt brine (from inland sources or from the sea) and limestone (from mines).

The Solvay process results in soda ash (predominantly sodium carbonate ($Na_2CO_3$)) from brine (as a source of sodium chloride (NaCl)) and from limestone (as a source of calcium carbonate ($CaCO_3$)). The overall process is given by $2NaCl+CaCO_3 \rightarrow Na_2CO_3+CaCl_2$.

However, industrial plants using the Solvay process produce waste and byproducts that may result in environmental problems, such as water pollution from calcium, chloride ions, and salt (NaCl) that accumulates in fresh water streams, ponds, and lakes.

Thus, a method of producing soda ash and calcium chloride solving the aforementioned problems is desired.

SUMMARY OF THE INVENTION

The method of producing soda ash and calcium chloride provides an environmentally friendly method of producing soda ash and calcium chloride without the production of waste and hazardous byproducts, or by recovering and recycling such waste. The method of producing soda ash and calcium chloride is initiated with a volume of brine (NaCl+$H_2O$). The brine is ammoniated with gaseous ammonia to form ammoniated brine. Separately, limestone is used as a source of $CaCO_3$, and is heated to produce calcium oxide and carbon dioxide. The ammoniated brine is reacted with the carbon dioxide produced by the heating of the limestone to produce sodium bicarbonate, ammonium chloride and a brine effluent.

The sodium bicarbonate is then calcined and decomposed to produce soda ash and gaseous carbon dioxide. The calcium oxide is reacted with the ammonium chloride to produce calcium chloride, water and ammonia, but without slaking the calcium oxide with water to produce milk of lime or aqueous calcium hydroxide. The dry lime used in the ammonia recovery process reduces the amount of effluent. The ammonia is collected and recycled to be used in the initial step of ammoniating the brine. The effluent from the ammonia recovery process includes unreacted NaCl from the brine water. The NaCl is separated from the effluent by crystallization and centrifuge units, and recycled to prepare more brine water. Calcium chloride is recovered from the remaining effluent by evaporation of excess water as a primary product of the process, along with the soda ash.

These and other features of the present invention will become readily apparent upon further review of the following specification and drawings.

BRIEF DESCRIPTION OF THE DRAWINGS

The sole drawing FIGURE is a flow diagram showing the steps of a method of producing soda ash and calcium chloride according to the present invention.

Similar reference characters denote corresponding features consistently throughout the attached drawings.

DETAILED DESCRIPTION OF THE PREFERRED EMBODIMENTS

The method of producing soda ash and calcium chloride provides an environmentally friendly method of producing soda ash and calcium chloride by recovering and recycling effluents and byproducts from a modified Solvay process. The method of producing soda ash and calcium chloride is initiated with a volume of brine (NaCl+$H_2O$) (step 10 in the sole drawing FIGURE). At step 20, the brine is ammoniated with gaseous ammonia by bubbling ammonia through the brine to form ammoniated brine. Separately, limestone is provided as a source of $CaCO_3$ (step 30), and is heated in a lime kiln or the like to produce calcium oxide (CaO) and carbon dioxide ($CO_2$) (step 40). At step 50, the ammoniated brine is reacted with the carbon dioxide produced by the heating of the limestone in step 40 to produce sodium bicarbonate ($NaHCO_3$), which precipitates in the basic brine solution, and ammonium chloride ($NH_4Cl$) in the brine effluent. The reaction of step 50 may take place in a carbonation tower or the like.

The sodium bicarbonate is then calcined and decomposed to produce soda ash and gaseous carbon dioxide. Preferably, the calcination and decomposition takes place through filtering at step 60 and heating at step 70, yielding the end product of soda ash ($Na_2CO_3$) at step 80 via the reaction $2NaHCO_3 \rightarrow Na_2CO_3+H_2O+CO_2$.

The filtering at step 60 separates out the ammonium chloride and brine effluent produced at step 50 and delivers them to an ammonia recovery system at step 90. The water produced by the calcination is also delivered with the brine effluent to the ammonia recovery system. The carbon dioxide produced by the heating/calcination process is then recycled, as shown in the sole drawing FIGURE, to the carbonation tower at step 50.

At step 90, the calcium oxide (CaO) produced in step 40 is reacted with the ammonium chloride ($NH_4Cl$) produced in step 50 to produce calcium chloride, water and ammonia as $CaO+2NH_4Cl \rightarrow_{CaCl2}+H_2O+2NH_3$. The calcium oxide is used without slaking, but is dry lime to reduce the amount of effluent. The ammonia ($NH_3$), which is in gaseous form, is collected at step 100 and recycled to be used in the initial step of ammoniating the brine (step 20).

The overall effluent from the ammonia recovery system at step 90, following separation of the ammonia gas, is approximately 5% sodium chloride (NaCl), approximately 10-13% calcium chloride ($CaCl_2$) and approximately 82% water. Approximately 10% of the calcium chloride is produced in a "wet" process, and approximately 13% is produced in a "dry" process. At step 110, sodium chloride (NaCl) is separated from the effluent by crystallization and centrifuge units, as indicated at step 120, and is recycled to prepare more brine at step 10. The evaporation process removes the water as water vapor, which is then condensed and recycled to make more brine at step 10. Any remaining water is evaporated to leave the end product of calcium chloride ($CaCl_2$), which is then collected at step 130. At step 130, the effluents from the calcium chloride feed liquor are collected and then delivered to a calcium chloride plant for further processing. At the plant, the distillation waste liquor is used to recover an approximately 77 wt % $CaCl_2$ flakes and/or 95 wt % $CaCl_2$ granules solution by evaporation and separation of salt (NaCl) therefrom.

It is to be understood that the present invention is not limited to the embodiments described above, but encompasses any and all embodiments within the scope of the following claims.

I claim:

1. A method of producing soda ash and calcium chloride, comprising the steps of:
   providing a source of brine;
   providing a source of gaseous ammonia;
   ammoniating brine with gaseous ammonia to form ammoniated brine;
   heating limestone to produce calcium oxide and carbon dioxide;
   reacting the ammoniated brine with the carbon dioxide produced by the step of heating the limestone to produce sodium bicarbonate, ammonium chloride and a brine effluent;
   calcining the sodium bicarbonate to decompose the sodium bicarbonate to produce soda ash and gaseous carbon dioxide;
   reacting the calcium oxide with the ammonium chloride and brine effluent to produce calcium chloride, brine effluent, and ammonia;
   wherein said step of reacting the calcium oxide with the ammonium chloride and brine effluent comprises reacting dry calcium oxide with the ammonium chloride and brine effluent without slaking the calcium oxide produced by heating the limestone;
   recycling the ammonia to be used in the step of ammoniating the brine; and
   recycling the water from the brine effluent to be used in the step of ammoniating the brine by crystallizing sodium chloride from the mixture of calcium chloride and brine effluent, separating the crystallized sodium chloride from the effluent by centrifuging the effluent, and recycling the crystallized sodium chloride;
   evaporating any water remaining to produce water vapor;
   recovering the produced calcium chloride;
   recycling the water vapor and condensing into water;
   wherein the crystallized sodium chloride is further used for the providing of fresh brine by combining with the condensed water to continue the method;
   collecting the produced calcium chloride;
   separating residual salt; and
   forming an approximately 77 wt % solution of calcium chloride flakes.

2. The method of producing soda ash and calcium chloride as recited in claim 1, further comprising the step of filtering the mixture of sodium bicarbonate, ammonium chloride, and brine prior to said calcining step, the brine and soluble ammonium chloride being removed for recovery of sodium chloride and ammonia.

3. The method of producing soda ash and calcium chloride as recited in claim 2, wherein said step of calcining the sodium bicarbonate comprises heating the filtered sodium bicarbonate to a temperature sufficient to decompose the sodium bicarbonate.

4. The method of producing soda ash and calcium chloride as recited in claim 1, further comprising the steps of condensing the water vapor and recycling the condensed water vapor for the formation of fresh brine with the recycled sodium chloride.

5. A method of producing soda ash and calcium chloride, comprising the steps of:
   mixing sodium chloride and water to form fresh brine;
   providing ammonia gas;
   bubbling the ammonia gas through the fresh brine to form ammoniated brine;
   heating limestone in a lime kiln to produce dry calcium oxide and carbon dioxide;
   bubbling the carbon dioxide through the ammoniated brine in a carbonation tower to produce sodium bicarbonate, ammonium chloride, and a brine effluent, the sodium bicarbonate precipitating in the brine effluent and the ammonium chloride being soluble in the brine effluent;
   filtering the brine effluent to remove the precipitated sodium bicarbonate;
   calcining the filtered sodium bicarbonate at a temperature sufficient to decompose the sodium bicarbonate to form soda ash as a major product;
   reacting the dry calcium oxide with the filtered brine effluent to produce ammonia gas and a brine effluent containing calcium chloride;
   wherein said step of reacting the dry calcium oxide with the filtered brine effluent to produce ammonia gas and a brine effluent containing calcium chloride comprises reacting dry calcium oxide with the ammonium chloride and brine effluent without slaking the calcium oxide produced by heating the limestone;
   recycling the ammonia gas produced by the reacting step to form additional ammoniated brine using the bubbling ammonia step;
   crystallizing sodium chloride in the brine effluent;
   centrifuging the brine effluent to separate the crystallized sodium chloride from the brine effluent;
   recycling the separated crystallized sodium chloride to form additional fresh brine using the mixing step;
   evaporating water from the effluent to form water vapor and to recover calcium chloride as a major product;
   collecting the produced calcium chloride;
   separating residual salt therefrom;
   forming a solution;
   wherein the solution is selected from a group consisting of an approximately 77 wt % solution of calcium chloride flakes, and an approximately 95 wt % solution of calcium chloride granules; and
   recycling the water vapor to form addition fresh brine using the mixing step;
   whereby all reactants are recycled, leaving substantially no waste to discharge.

6. A method of producing soda ash and calcium chloride, comprising the steps of:
   providing a source of brine;
   providing a source of gaseous ammonia;
   ammoniating brine with gaseous ammonia to form ammoniated brine;
   heating limestone to produce calcium oxide and carbon dioxide;
   reacting the ammoniated brine with the carbon dioxide produced by the step of heating the limestone to produce sodium bicarbonate, ammonium chloride and a brine effluent;
   calcining the sodium bicarbonate to decompose the sodium bicarbonate to produce soda ash and gaseous carbon dioxide;

reacting the calcium oxide with the ammonium chloride and brine effluent to produce calcium chloride, brine effluent, and ammonia;

recycling the ammonia to be used in the step of ammoniating the brine; and recycling the water from the brine effluent to be used in the step of ammoniating the brine by crystallizing sodium chloride from the mixture of calcium chloride and brine effluent, separating the crystallized sodium chloride from the effluent by centrifuging the effluent, and recycling the crystallized sodium chloride;

evaporating any water remaining to produce water vapor;

recovering the produced calcium chloride;

recycling the water vapor and condensing into water;

wherein the crystallized sodium chloride is further used for the providing of fresh brine by combining with the condensed water to continue the method;

collecting the produced calcium chloride;

separating residual salt; and forming an approximately 95 wt % solution of calcium chloride granules.

7. The method of producing soda ash and calcium chloride as recited in claim 6, further comprising the step of filtering the mixture of sodium bicarbonate, ammonium chloride, and brine prior to said calcining step, the brine and soluble ammonium chloride being removed for recovery of sodium chloride and ammonia.

8. The method of producing soda ash and calcium chloride as recited in claim 7, wherein said step of calcining the sodium bicarbonate comprises heating the filtered sodium bicarbonate to a temperature sufficient to decompose the sodium bicarbonate.

9. The method of producing soda ash and calcium chloride as recited in claim 6, further comprising the steps of:

condensing the water vapor;

recycling the condensed water vapor; and forming fresh brine with the recycled sodium chloride.

10. The method of producing soda ash and calcium chloride as recited in claim 6, wherein said step of reacting the calcium oxide with the ammonium chloride and brine effluent by reacting dry calcium oxide with the ammonium chloride and brine effluent without slaking the calcium oxide produced by heating the limestone.

* * * * *